United States Patent [19]

Cullen et al.

[11] Patent Number: 5,678,526
[45] Date of Patent: Oct. 21, 1997

[54] SYSTEM AND DIAGNOSTIC METHOD FOR PROVIDING INTERNAL COMBUSTION ENGINE WITH OXYGEN ENRICHED AIR

[75] Inventors: Michael John Cullen, Northville; John William Hoard, Livonia, both of Mich.

[73] Assignee: Ford Global Technologies, Inc., Dearborn, Mich.

[21] Appl. No.: 694,584

[22] Filed: Aug. 9, 1996

[51] Int. Cl.$^6$ .................................................. F02D 41/14
[52] U.S. Cl. ................................. 123/690; 123/699
[58] Field of Search ................................. 123/690, 699, 123/567, 585

[56] References Cited

U.S. PATENT DOCUMENTS

| | | | |
|---|---|---|---|
| 4,960,098 | 10/1990 | Akerib | 123/699 |
| 5,051,113 | 9/1991 | Nemser | 95/54 |
| 5,051,114 | 9/1991 | Nemser | 95/47 |
| 5,168,706 | 12/1992 | Kamamura | 123/585 |
| 5,526,641 | 6/1996 | Sekar et al. | 123/585 |
| 5,553,591 | 9/1996 | Yi | 123/585 |

FOREIGN PATENT DOCUMENTS

| | | | |
|---|---|---|---|
| 180746 | 10/1983 | Japan | 123/585 |
| 187573 | 11/1983 | Japan | 123/699 |
| 2122103 | 1/1984 | United Kingdom . | |

OTHER PUBLICATIONS

SAE 710606, "Emissions Study of Oxygen Enriched Air", Wartinbee, Jr., Jun. 6, 1971.

SAE 830245, "Effect of Oxygen Enrichment on Performance and Emissions of I.D.I. Diesel Engines", Ghohel et al, Feb. 28, 1983.

SAE 881658, "Performance of Spark Ignition Engine Fueled by Natural Gas Using Oxygen Enriched Air", Detuncq et al, Jun. 1988.

SAE 900344, "New Look at Oxygen Enrichment 1) The Diesel Engine", Watson et al, Mar. 1990.

SAE 901565, "Cylinder Pressure Analysis of a Diesel Engine Using Oxygen–Enriched Air and Emulsified Fuels", Sekar et al, May, 1990.

"The Effect of Oxygen Enriched Air on Performance and Emissions of an Internal Combustion Engine", Maxwell et al, Mechanical Engineering Dept., Texas Tech University (No Date Given).

*Primary Examiner*—Willis R. Wolfe
*Attorney, Agent, or Firm*—Jerome R. Drouillard

[57] ABSTRACT

An internal combustion engine has a system, including diagnostics, for providing oxygen enriched air so as to control emissions of unburned hydrocarbons and carbon monoxide. The system includes the capability of determining whether the oxygen enrichment system is providing suitable mass flow to the engine and whether oxygen enrichment is available according to the specifications of the enrichment device.

7 Claims, 3 Drawing Sheets

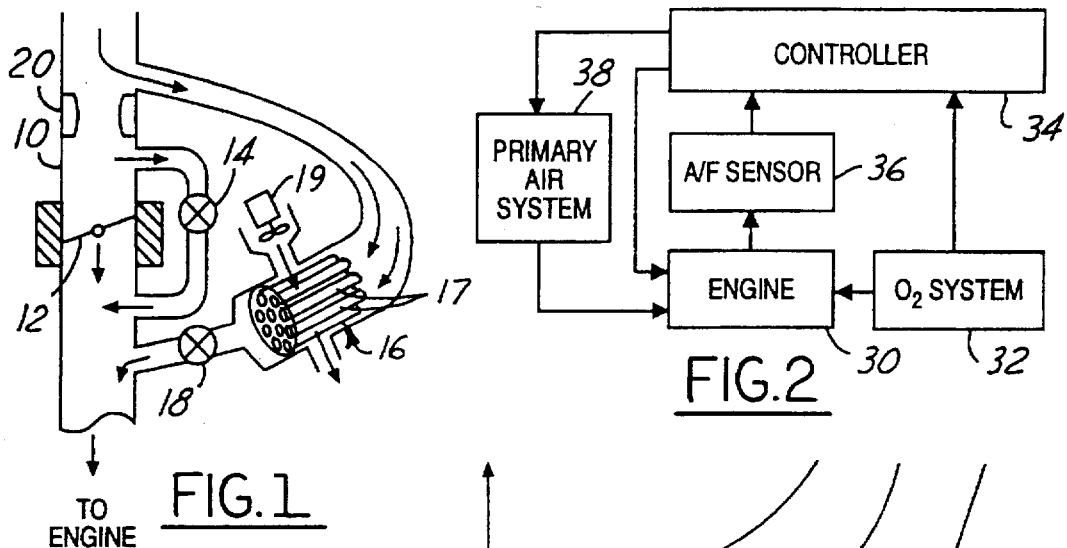
FIG. 1
FIG. 2
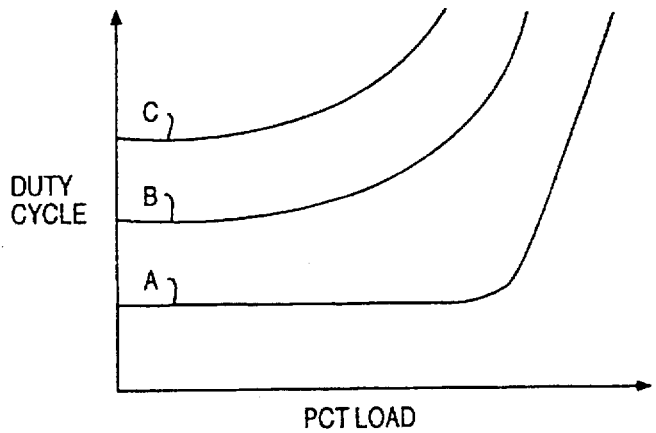
FIG. 5
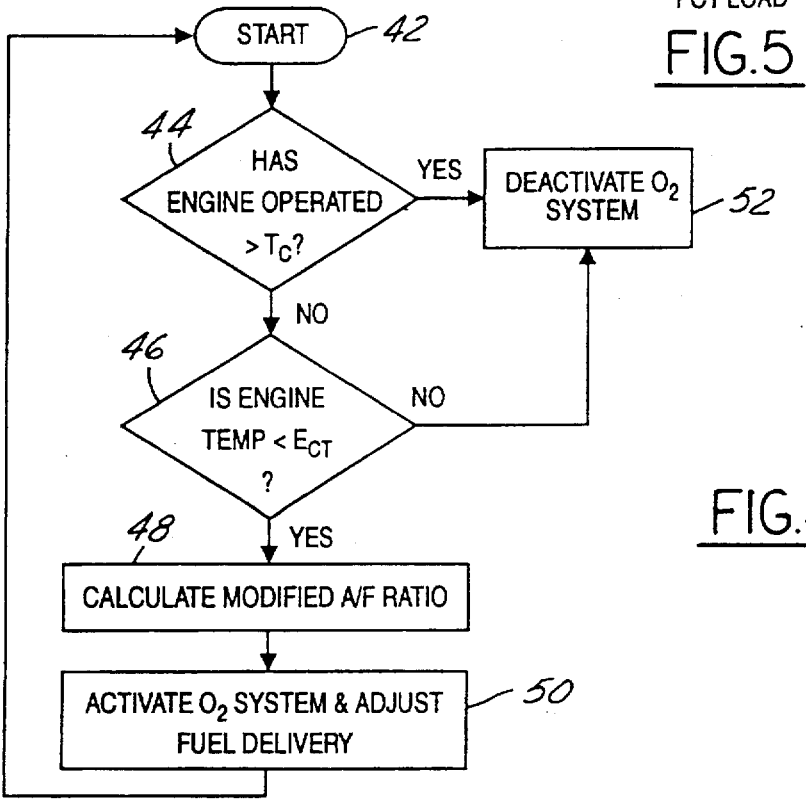
FIG. 3

SYSTEM AND DIAGNOSTIC METHOD FOR PROVIDING INTERNAL COMBUSTION ENGINE WITH OXYGEN ENRICHED AIR

BACKGROUND OF THE INVENTION

1. Field of the Invention

The present invention relates to an enhancement to internal combustion engine emission control systems, so as to allow an engine to operate at a leaner air/fuel ratio during certain engine operating conditions.

2. Disclosure Information

As tailpipe emission controls on motor vehicles have become increasingly more stringent, engineers charged with the responsibility for developing control systems for such vehicles have been increasingly challenged by the need to obtain rapid control over emissions during the initial period of operation of a cold engine. More specifically, unburned hydrocarbons present a particular design and development problem for emission control engineers because during the first few seconds of operation of a cold engine, exhaust treatment catalysts are ineffective because of the time lag associated with lighting off or activation of the catalyst, which, of course, is dependent upon thermal activity. The problem is exacerbated by the fact that cold engines tend to collect unburned hydrocarbons in the quench areas within the combustion chamber; the unburned hydrocarbons are subsequently discharged through the engine's exhaust system after flowing through catalysts which are not warm enough to function properly.

The inventors of the present invention determined a system and method for efficiently using a polymeric oxygen enrichment device having a membrane exposed to engine vacuum to provide oxygen enriched air to the engine's combustion chambers. The effect of increased oxygen level is marked in many engines, and increased oxygen level is marked in many engines, and this effect has been demonstrated in the past. Without wishing to be bound by the theory, it appears that higher concentrations of oxygen increase the ability of oxygen in the mixture to bond with hydrocarbons and to provide a more readily combustible hydrocarbon mixture.

SUMMARY OF THE INVENTION

An internal combustion engine includes a system for providing the engine with oxygen enriched air and fuel. The system includes an oxygen enriched air supply system connected with the combustion air intake of the engine, with the air supply system comprising a polymeric oxygen enrichment device having a membrane exposed to engine vacuum on one side and atmospheric air on the other side. An enrichment valve controls the flow of air through the membrane and into the engine's air intake. In addition to the enrichment valve, a controller operates a primary valve which controls a primary, nonenriched airflow in the combustion air intake. This primary valve may comprise a conventional idle air bypass valve. The controller also operates a fuel system for furnishing fuel to the engine. The controller determines the desired air/fuel ratio for operating the engine and for controlling the enrichment valve, the fuel system, and the primary valve, so as to maintain the desired air/fuel ratio.

According to another aspect of the present invention, a diagnostic system for verifying proper operation of an internal combustion engine having an air enrichment system for providing the engine with an additional oxygen enriched airflow includes a state identifier for identifying and indicating an appropriate engine operating condition during which the air enrichment system may be activated without disturbing the engine's operation, and an air/fuel correction system for determining an air/fuel correction factor whose value is proportional to the difference between a desired engine air/fuel ratio and the engine's actual air/fuel ratio. The system further includes a primary airflow sensing system for determining the mass airflow rate required by the engine and a controller operatively connected with the state identifier as well as with the air/fuel correction system and with the engine airflow sensing system. The controller performs a diagnosis of the air enrichment system according to the steps of: determining engine primary airflow prior to activation of the air enrichment system; determining the engine's air/fuel correction factor prior to activation of the air enrichment system; activating the air enrichment system during an appropriate operating condition indicated by the state identifier; comparing the engine's primary airflow following activation of the air enrichment system with the primary airflow prior to activation of the air enrichment system, and setting an airflow flag in the event that the value of the primary airflow does not change by more than a predetermined amount. The diagnosis includes the further steps of: comparing the value of the engine's air/fuel correction factor following activation of the air enrichment system with the air/fuel correction factor prior to activation of the air enrichment system and setting an air/fuel correction flag in the event that the value of the air/fuel correction factor changes by more than a predetermined amount; and disabling the air enrichment system in the event that either the airflow flag or the air/fuel correction flag has been set.

It is an advantage of the present system that proper operation of the air enrichment system may be verified without disturbing the engine's operation because the system may be tested during periods of warm engine idle, for example, while at the same time obtaining appropriate correction factors for use in operating the system.

It is another advantage of the present system that it will cut the emission of unburned hydrocarbons from the engine during cold, initial engine operation, thereby enhancing the emission control system and producing a lower level of tailpipe emissions.

Other advantages of the present system will become apparent to the reader of this specification.

BRIEF DESCRIPTION OF THE DRAWINGS

FIG. 1 is a schematic representation of an internal combustion engine having an oxygen enriched air supply system according to the present invention.

FIG. 2 is a block diagram illustrating an oxygen enriched air supply system according to the present invention.

FIG. 3 is block diagram showing operation of a system according to the present invention during normal engine operating conditions.

FIG. 5 is a plot illustrating operating curves for a polymeric oxygen enrichment device which may be used in a system according to the present invention.

DETAILED DESCRIPTION OF PREFERRED EMBODIMENTS

Figure 4:
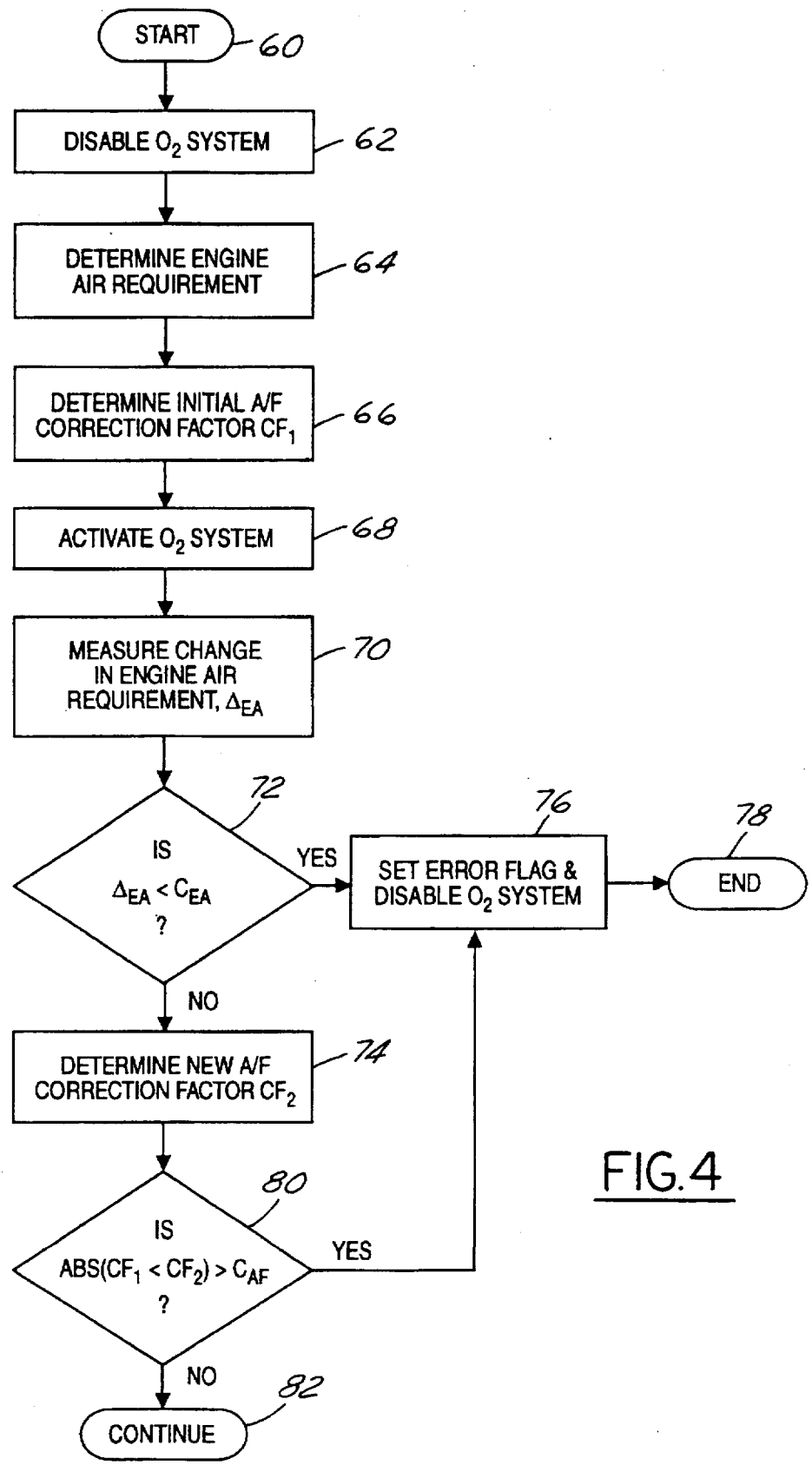
FIG. 4 is a block diagram illustrating operation of a system according to the present invention in a diagnostic routine.

As shown in FIG. 1, engine air intake duct 10 is equipped with idle bypass valve 14 which allows air to pass around throttle plate 12 so as to provide the engine with air for combustion during idle operation. Valve 14 is controlled by controller 34 of FIG. 2, which illustrates primary air system 38. The primary air system includes valve 14. Air which is enriched in oxygen is provided by polymeric oxygen enrichment device 16 which is taken from the class of devices known to those skilled in the art and suggested by this disclosure.

As noted above, oxygen enrichment/nitrogen enleanment of the mixture inducted into the engine's cylinders promotes better combustion stability and allows leaner operation of the engine. This is important for fast catalyst light-off of stoichiometric or leaner mixtures. Operation with nitrogen enleanment, or stated another way, with oxygen enriched air, raises the exhaust temperature compared to more fuel-rich mixtures, while reducing unburned hydrocarbons and carbon monoxide in the feedgases flowing from the engine. U.S. Pat. No. 5,051,113 discloses one type of amorphous polymeric oxygen enrichment membrane; those skilled in the art will, after being informed by this disclosure, undoubtedly recognize other types of membranes which could be used for the purpose of achieving oxygen enrichment according to the present invention. The flow of oxygen enriched air, which is the permeate through the membrane and which flows into air intake duct 10, is controlled by valve 18, the enrichment valve, by means of controller 34. Thus, it is seen that two streams of air flow in the engine during idle operation. One stream of air flows past idle bypass valve 14, while the second stream of air flows through polymeric enrichment device 16, which contains a bundle of tubes 17, through which oxygen passes preferentially with the oxygen depleted or nitrogen enriched air being pushed by fan 19 from the retentate side of tube bundle 17.

Because the oxygen content of the air stream entering the engine is greater than would otherwise be the case, it is necessary for controller 34, which is shown in FIG. 2, to calculate a new, lower numerical air/fuel ratio for the engine. Controller 34 calculates a modified air/fuel ratio as shown in FIG. 3. When it is desired to operate the present system, for example, during a cold start of the engine, the routine begins with the start command at block 42 of FIG. 3. Controller 34, which may comprise a conventional engine microprocessor controller having a bank of sensors operatively connected therewith, will ask the question at block 44 as to how long the engine has operated. If the engine has operated greater than time constant $T_C$, then the oxygen enrichment system will be deactivated at block 52. If, however the engine is not operated for a time equal to time $T_C$, controller 34 will pass to block 46 where it will inquire as to the engine temperature. If the engine temperature at block 46, specifically the engine coolant temperature, is less than a constant value $E_{CT}$, then the routine will continue at block 48 with the first step of implementing the oxygen enrichment process. If, however, at block 46 engine coolant temperature exceeds $E_{CT}$, the oxygen enrichment system will once again be deactivated at block 52.

At block 48, controller 34 calculates a modified air/fuel ratio using a weighted average oxygen concentration for air entering engine 30. The weighted average calculation is based in part upon percent duty cycles for opening the enrichment valve 18 and bypass valve 14. In other words, the percentages of time during which each of valves 14 and 18 are open determines the relative contributions of primary air system 38, which in this case is the idle bypass system including valve 14, and oxygen enrichment device 16. Because a technologist applying a system according to the present invention will know the characteristic operating curves of both air systems, the calculation of weighted average oxygen is simple ratio calculation. Those skilled in the art will appreciate in view of this disclosure that valves 14 and 18 are merely illustrative of a class of control valves which may include, for example, duty cycle modulated solenoid valves, stepper motor driven valves, and other electronically controlled gas flow valves.

The calculation in block 48 is made according to the following equation:

$$STOIC\_AF = \frac{AMB\_AM * AMB\_AF + OMS\_AM * OMS\_AF * ADP}{AMB\_AM + OMS\_AM}$$

where:

AMB_AM=air mass entering the engine other than through the oxygen enrichment device (ambient)

AMB_AF=A/F ratio with gasoline and ambient air

OMS_AM=air mass through the oxygen enrichment system

OMS_AF=A/F ratio with gasoline and oxygen enriched air

ADP=adaptive correction to OMS_AF

FIG. 5 illustrates duty cycle, percent engine load, and mass flow relationships for a typical polymeric oxygen enrichment device suitable for use in a system according to the present invention. Thus, as valve 18 is duty cycled at higher percents, the air mass output of the device 16 increases from line A to line C. Percent load is defined herein as the percent of maximum possible airflow which is passing through the engine. Of course, those skilled in the art recognize that the maximum possible airflow is strongly a function of engine speed, altitude, and charge air temperature.

The actual air/fuel ratio is adjusted by adjusting the fuel delivery at block 50. Having adjusted the fuel delivery, controller 34 then returns to block 42 and recycles through the routine illustrated in FIG. 3.

FIG. 4 illustrates a diagnostic system and method according to the present invention, wherein controller 34 begins at block 60 with a start command, which is issued only after a state identifier, which is in this case, controller 34, identifies an appropriate engine operating condition during which the air enrichment system may be activated without disturbing the engine's operation. It is desirable to avoid triggering of the oxygen enrichment system at times when a fuel lean excursion of air/fuel ratio could cause vehicle operation problems. This dictates, for example, that the diagnostic illustrated in FIG. 4 be performed when the engine is idling and the catalyst system is fully warmed to operational temperature.

Having started at block 60, controller 34 disables the oxygen enrichment system at block 62. This disablement is necessary to accurately determine the engine air requirement at block 64. For this purpose, the controller will receive data from air/fuel sensor 36. At block 66, controller 34 determines an initial air/fuel correction factor $CF_1$. In general, the use of air/fuel correction factors is known to those skilled in the art to which this invention pertains. Such correction factors are employed for the purpose of correcting an open-loop air/fuel ratio calculation by using an air/fuel sensor 36. At block 68, controller 34 activates the oxygen enrichment system by duty cycle modulating enrichment valve 18. Then, at block 70, controller 34 measures change in engine air requirement, $\Delta_{EA}$. In essence, controller 34, by noting the change in the engine intake air flowing through valve 14 while engine 30 is idling, will establish whether the oxygen enriched air supply system is actually flowing air.

At block 72, controller 34 compares $\Delta_{EA}$ with a constant $C_{EA}$. If the change in primary airflow is less than a predetermined constant, this means that air is not able to flow through oxygen enrichment device 16, and at block 76, controller 34 will set an error flag and disable the oxygen enrichment system. If, however, the answer to the question posed in block 72 is no, this means that the change in airflow through idle bypass valve 14 around throttle plate 12 is greater than predetermined constant $C_{EA}$, and at block 74, controller 34 will determine a new air/fuel correction factor $CF_2$. This new air/fuel correction factor takes into account the weighted average oxygen content of the airflow entering the engine through both valves 14 and 18. If the oxygen enrichment system is working properly, the difference between the closed loop air/fuel ratio calculation equations and the actual air/fuel ratio, which difference gives rise to the air/fuel correction factor $CF_2$, will be minimal.

At block 80, controller 34 determines the difference between correction factors $CF_1$ and $CF_2$. If the absolute value of the difference between correction factors $CF_1$ and $CF_2$ is greater than a constant $C_{AF}$, then controller 34 moves to block 76, wherein an error flag is set once again and the oxygen enrichment system is disabled. If, however, the difference between correction factors $CF_1$ and $CF_2$ is less than constant $C_{AF}$, then controller 34 continues at block 82 with a command to reset diagnostic for a later time.

Figure 6:
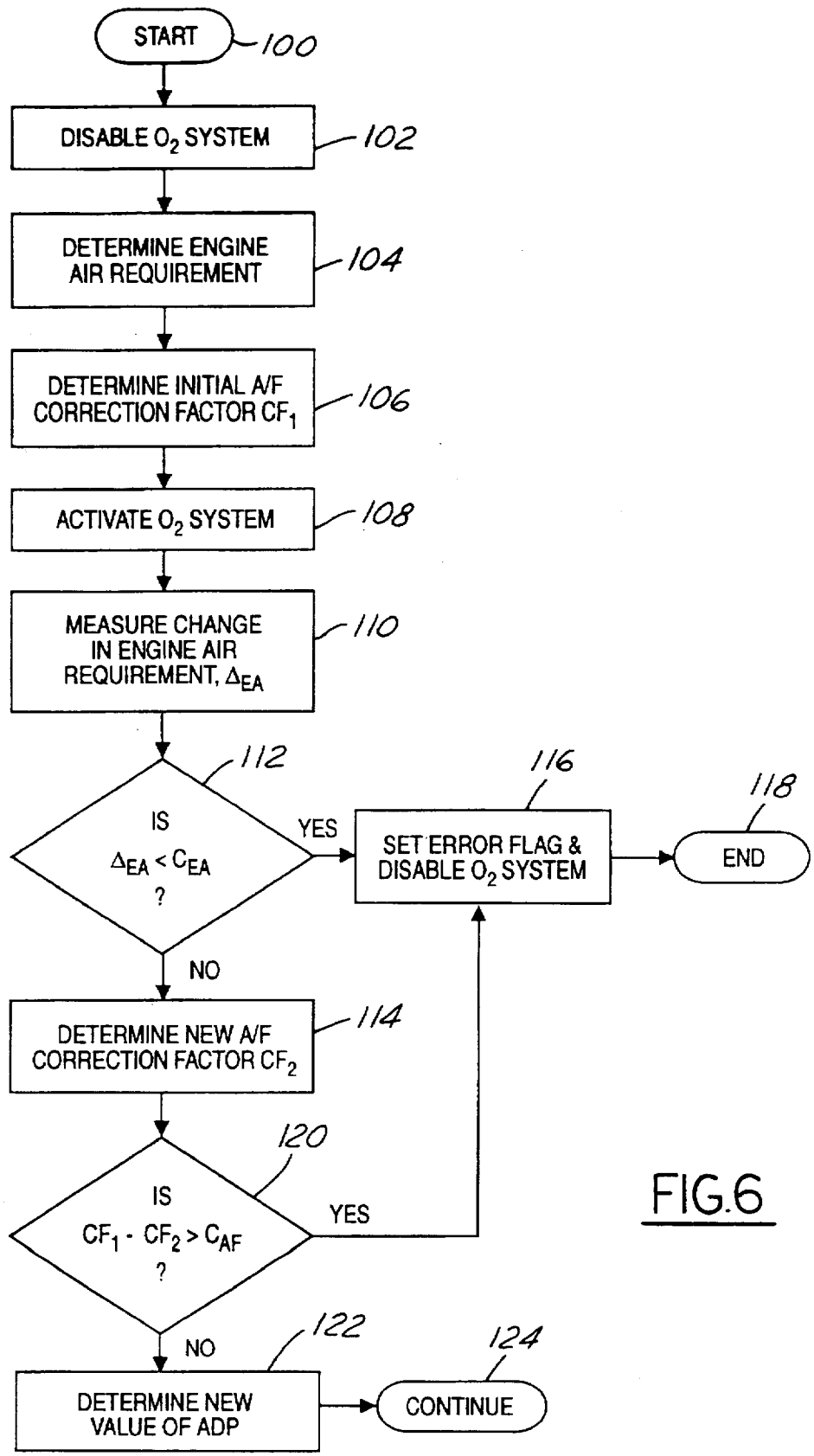
FIG. 6 is a flowchart illustrating operation of a second type of diagnostic subroutine according to the present invention.

The embodiment shown in FIG. 6 although similar to that of FIG. 4, provides for adaptive correction for the modified air/fuel ratio calculation of block 48 of FIG. 3. At blocks 100, 102, 104, and 106, previously described calculations and determinations are made and actions are taken. However, at block 108, the routine calls for activation of the oxygen enrichment system is activated with variable ADP= 1. ADP is an adaptive multiplier for altering the value of correction factors $CF_1$ and $CF_2$. Then, after continuing through blocks 110, 112, 114, and moving to block 120, controller 34 inquires as to whether the difference between correction factors $CF_1$ and $CF_2$ is greater than constant $C_{AF}$. If the answer is yes, then the oxygen enrichment system is disabled at block 116. If, however, the answer is no, controller 34 moves to block 122, wherein a new value of ADP is determined according to the following expression:

$$ADP = \frac{(CF_2/CF_1)*(AMB\_AM*AMB\_AF + OMS\_AM*OMS\_AF) - (AMB\_AM \cdot AMB\_AF)}{OMS\_AM*OMS\_AF}$$

This new value of ADP, which, as set forth above, is a function of at least the ratio of the air/fuel corrections factors $CF_1$ and $CF_2$, is then employed in the routine of FIG. 3. In this manner, a system according to the present invention will be able to account for changes in the operating characteristics of the oxygen enrichment device. For example, it is possible that the device may operate with greater or lesser efficiency than expected. If this occurs, the oxygen output of the device will be different than the output predicted by its characteristic parametric analysis. But, the present system will be able to respond to such differences in output, allowing the engine to operate properly with the oxygen enrichment device.

Those skilled in the art will appreciate in view of this disclosure that modifications may be made according to a system covered by the claims of this invention.

We claim:

1. A diagnostic system for verifying proper operation of an internal combustion engine having an air enrichment system for providing the engine with an additional oxygen enriched airflow, with said diagnostic system comprising:

a state identifier for identifying and indicating an appropriate engine operating condition during which the air enrichment system may be activated without disturbing the engine's operation;

an A/F correction system for determining an air/fuel correction factor whose value is proportional to the difference between a desired engine air/fuel ratio and the engine's actual air/fuel ratio;

a primary airflow sensing system for determining the mass airflow rate required by the engine; and a controller operatively connected with said state identifier, with said A/F correction system, and with said engine airflow sensing system, with said controller performing a diagnosis of the air enrichment system according to the steps of:

determining the engine's primary airflow prior to activation of the air enrichment system;

determining the engine's air/fuel correction factor prior to activation of the air enrichment system;

activating the air enrichment system during an appropriate operating condition indicated by said state identifier;

comparing the engine's primary airflow following activation of the air enrichment system with the primary airflow prior to activation of the air enrichment system, and setting an airflow flag in the event that the value of the primary airflow does not change by more than a predetermined amount;

determining the engine's air/fuel correction factor following activation of the oxygen enrichment system and comparing the value of the correction factor following activation of the air enrichment system with the air/fuel correction factor prior to activation of the oxygen enrichment system and setting an A/F correction flag in the event that the value of the air/fuel correction factor changes by more than a predetermined amount; and disabling the air enrichment system in the event that either the airflow flag or the A/F correction flag has been set.

2. A system according to claim 1, wherein an air/fuel multiplier for the correction factor used when the oxygen enrichment system is in operation is determined as function of at least the value of the air/fuel correction factor determined without the oxygen enrichment system in operation divided by the air/fuel correction factor with the enrichment system in operation.

3. An internal combustion engine having a system for providing the engine with oxygen enriched air and fuel, with said oxygen enriched air being provided only during periods of operation when the engine is cold and at idle, with said system comprising:

an oxygen enriched air supply system connected with a combustion air intake of the engine, with said air supply system comprising a polymeric oxygen enrichment device having a membrane exposed to engine vacuum on one side and atmospheric air on the other side, and an enrichment valve for controlling flow through the membrane and into the air intake;

a bypass valve for controlling a non-enriched airflow into the combustion air intake;

a fuel system for furnishing fuel to the engine; and a controller for determining a desired air/fuel ratio for operating the engine and for controlling the enrichment valve, the fuel system, and the bypass valve, so as to maintain the desired air/fuel ratio.

4. An internal combustion engine according to claim 3, wherein said controller determines an appropriate amount of fuel for said engine by calculating a weighted average oxygen concentration for air entering the engine, with said weighted average calculation being based in part upon percent duty cycles for opening the enrichment and bypass valves.

5. An internal combustion engine having a system for providing the engine with oxygen enriched air and fuel, comprising:

an oxygen enriched air supply system connected with a combustion air intake of the engine, with said air supply system comprising a polymeric oxygen enrichment device having a membrane exposed to engine vacuum on one side and atmospheric air on the other side, and an enrichment valve for controlling flow through the membrane and into the air intake;

a primary valve for controlling a primary, nonenriched airflow into the combustion air intake;

a fuel system for furnishing fuel to the engine; and a controller for determining a desired air/fuel ratio for operating the engine and for controlling the enrichment valve, the fuel system, and the primary valve, so as to maintain the desired air/fuel ratio.

6. An internal combustion engine according to claim 1, wherein said controller provides the engine with oxygen enriched air only during idle operation.

7. An internal combustion engine according to claim 1, wherein said controller provides the engine with oxygen enriched air only during cold engine operation.

* * * * *